Dec. 6, 1938.  R. J. GETTY  2,139,362

METHOD AND APPARATUS FOR MANUFACTURING POTTERY ARTICLES

Filed Aug. 11, 1936   5 Sheets-Sheet 2

INVENTOR.
Ralph J. Getty
BY Edward A. Lawrence
his ATTORNEY.

Dec. 6, 1938.   R. J. GETTY   2,139,362
METHOD AND APPARATUS FOR MANUFACTURING POTTERY ARTICLES
Filed Aug. 11, 1936   5 Sheets-Sheet 3

INVENTOR.
Ralph J. Getty,
BY Edward A. Lawrence
ATTORNEY.

Dec. 6, 1938.  R. J. GETTY  2,139,362
METHOD AND APPARATUS FOR MANUFACTURING POTTERY ARTICLES
Filed Aug. 11, 1936  5 Sheets-Sheet 4
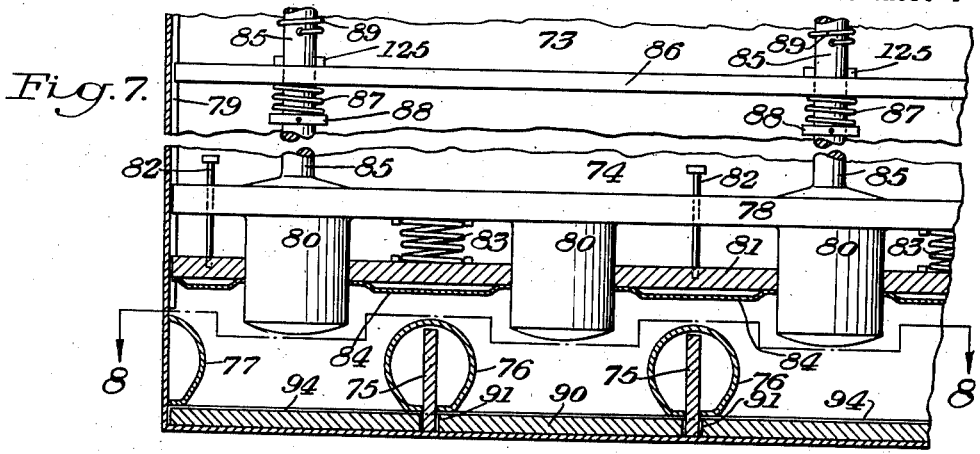
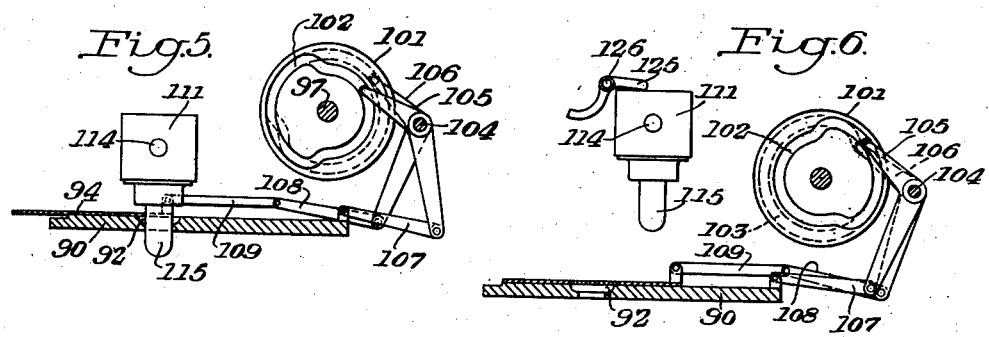
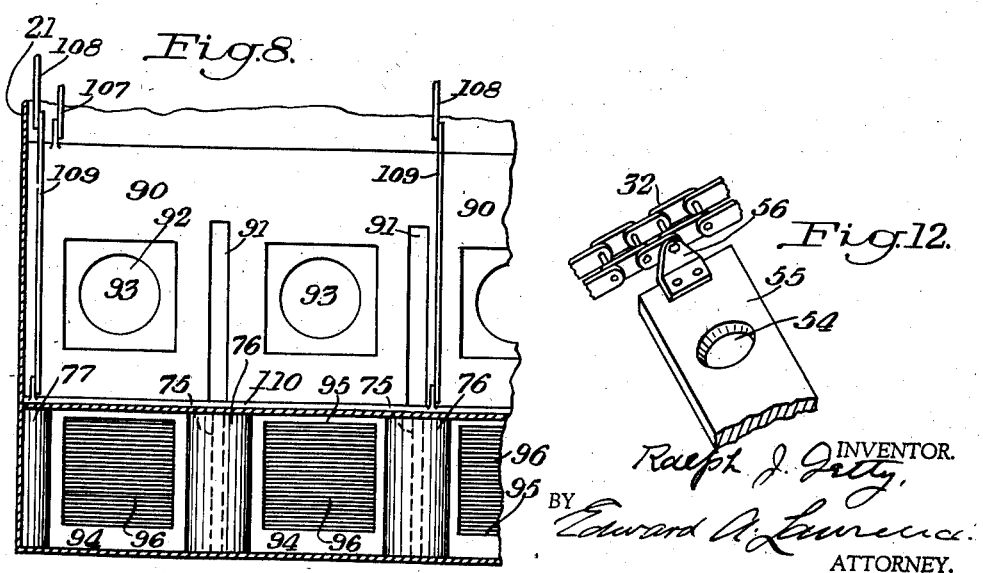
INVENTOR.
Ralph J. Getty
BY Edward A. Lawrence
ATTORNEY.

Dec. 6, 1938.  R. J. GETTY  2,139,362
METHOD AND APPARATUS FOR MANUFACTURING POTTERY ARTICLES
Filed Aug. 11, 1936  5 Sheets-Sheet 5
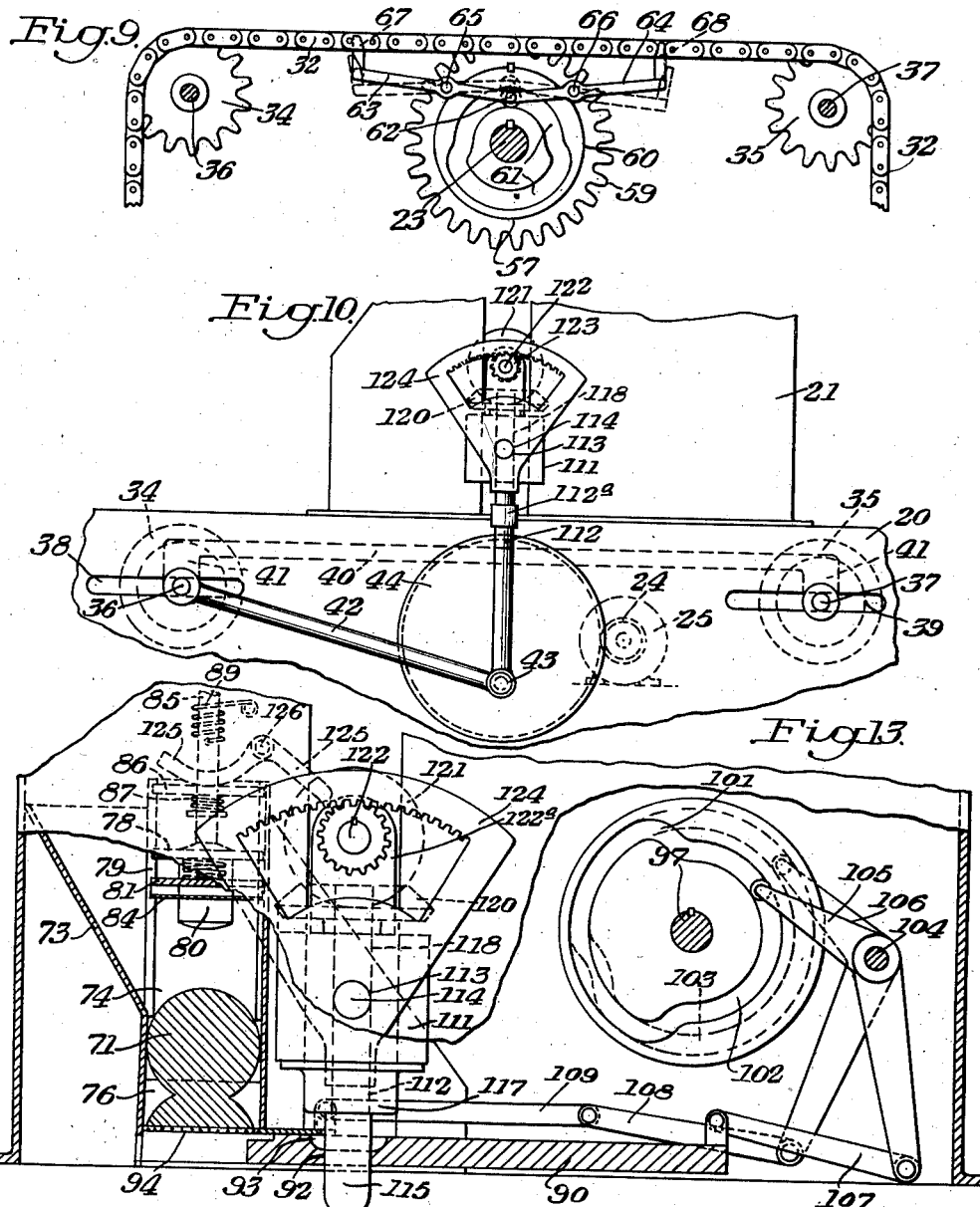
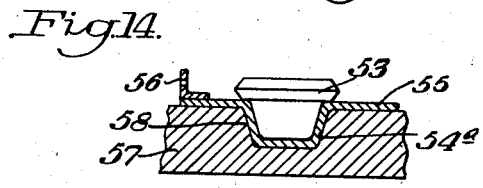
ATTORNEY.

Patented Dec. 6, 1938

2,139,362

UNITED STATES PATENT OFFICE 2,139,362

METHOD AND APPARATUS FOR MANUFACTURING POTTERY ARTICLES

Ralph J. Getty, Pittsburgh, Pa., assignor of one-half to Albert L. Feller, Castle Shannon, Pa.

Application August 11, 1936, Serial No. 95,319

15 Claims. (Cl. 25—22)

This invention relates generally to methods and apparatus for the manufacture of articles from plastic material and more particularly to the manufacture of pottery.

The present practice of manufacturing pottery by machine follows generally the principles adhered to by the hand forming potters. These principles required a rotating table or mold on which the clay is shaped and trimmed. The clay discarded by the potter in following this practice is returned to the source of supply.

In making pottery by the use of a mold and a profiling tool it is necessary to supply more clay than is required to produce the finished article to enable the profiling tool to perform its proper function. Thus a substantial waste of clay is an unavoidable part of this process.

However the clay that is discarded by the profiling tool in a pottery making machine is not used again as it is found to have lost the requisite properties for satisfactory fabrication.

Again if the profiling tool is improperly set, the cutting edge improperly formed, or if it has accumulated an excess of clay thereon, it will pull or tear the clay when forming the product and will therefore not produce smooth surfaces.

The principal object of this invention is the provision of new and improved apparatus and method for manufacturing pottery by machinery which avoids the difficulties experienced by the present practice in the art.

Among the novel characteristics of my invention may be mentioned the following:

The provision of a rotary forming tool arranged to deposit a charge or measured amount of clay for the ware being produced in a mold that is stationary relative to the forming tool.

The provision of means for measuring the proper amount of clay required to make a specific article, thus avoiding the necessity of a trimming tool, and the attendant waste of the clay.

The provision of means for varying the rotary speed of the forming tool as it works the clay. This produces a well shaped and smooth surfaced article.

The provision of means for reciprocating the rotary forming tool as it shapes the plastic material.

The provision of new and improved conveyer means for presenting the molds in the fabricating position and the provision for the proper dwell of the molds therein.

The provision of means for continuously conveying the article from the fabricating position after it has been shaped.

In the accompanying drawings wherein I have illustrated a practical embodiment of the principles of my invention:

Figs. 5 and 6 are diagrammatic views illustrating the relative positions in the operating cycle of the fabricating plunger and the plastic material measuring and feeding means.

Fig. 7 is an incomplete vertical section of the hopper on enlarged scale, showing the feeding and tamping and mold-charge forming means.

Fig. 8 is a horizontal section taken along the line 8—8 in Fig. 7.

Fig. 9 is a detailed view in side elevation showing the conveyer locking means.

Fig. 10 is a detail view in side elevation showing means for providing for the dwell of the molds in the ware fabricating position.

Fig. 12 is a detail perspective view showing the method of attaching the mold trays to the conveyer chains.

Fig. 13 is a vertical longitudinal section showing the feeding, mold-charge forming and fabricating plunger mechanism.

Fig. 14 is a sectional detail showing a modification in the sockets or the pockets of the mold-trays.

Figure 1:
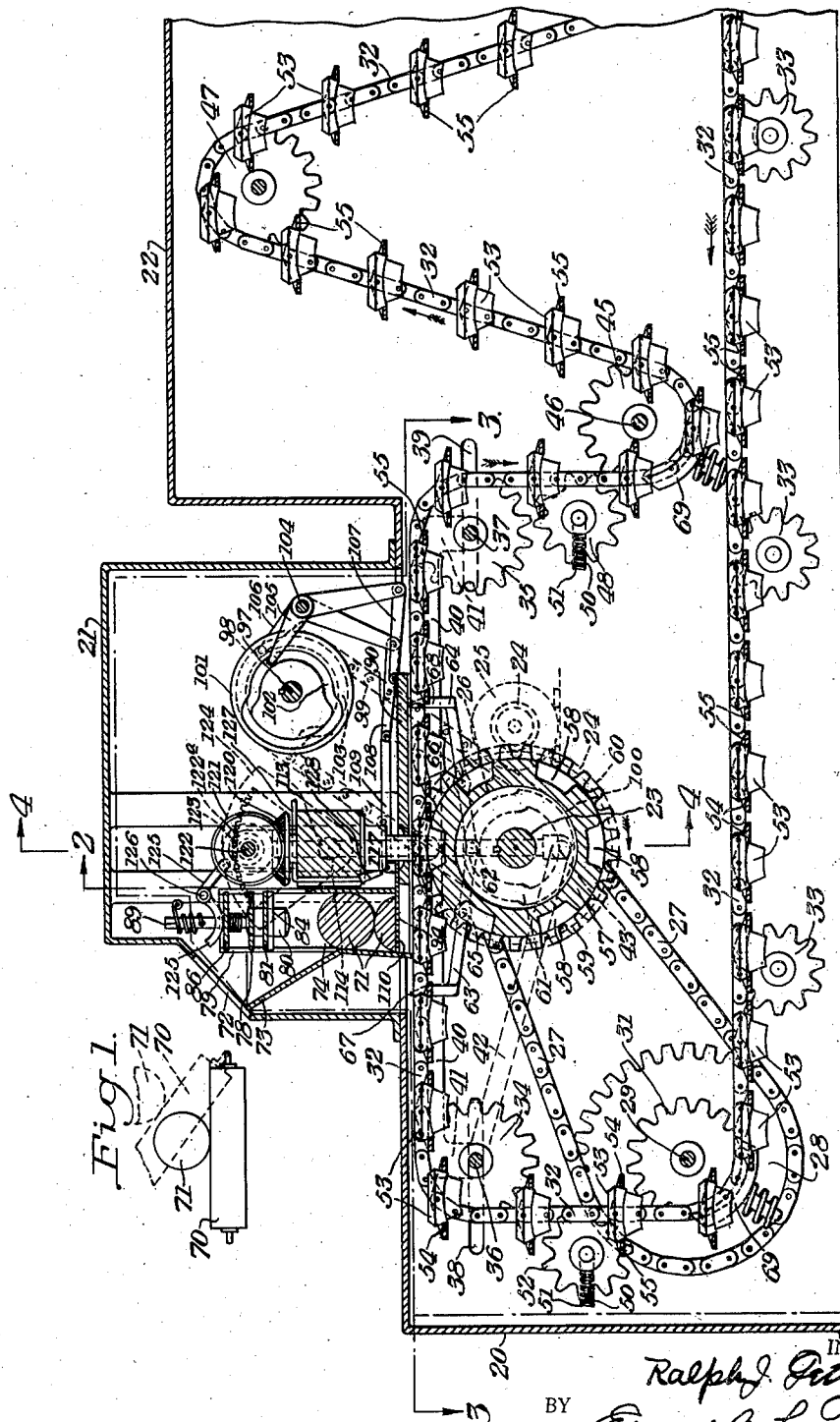
Fig. 1 is a vertical section through the machine.
Figure 2:
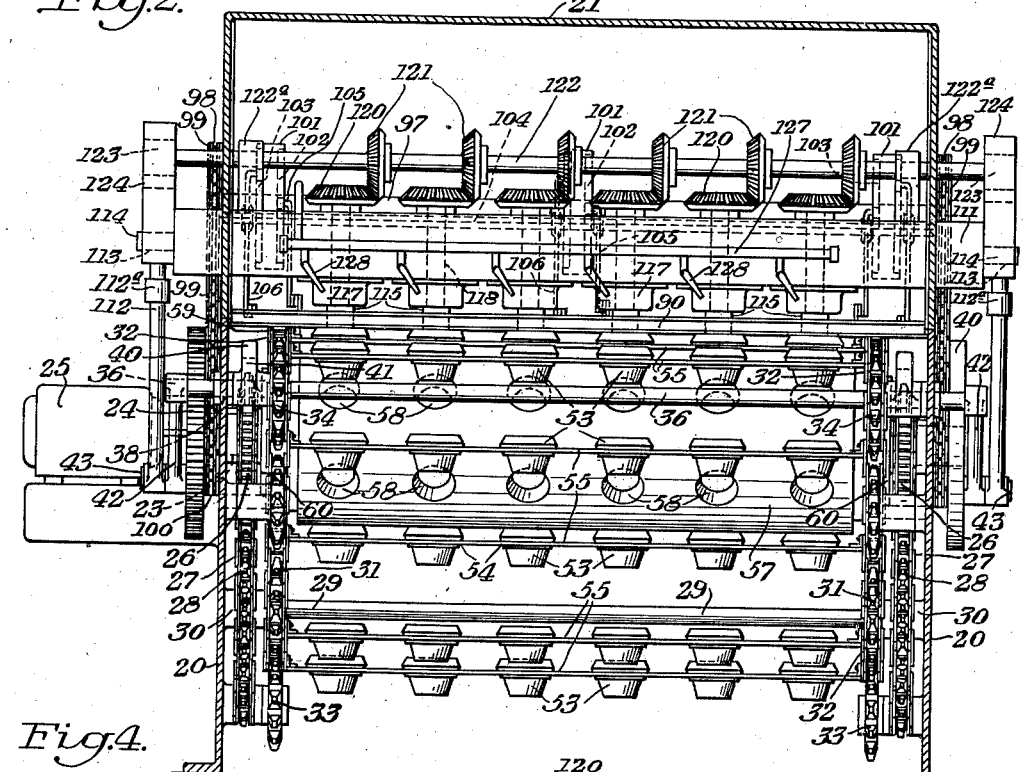
Fig. 2 is a transverse section taken along the irregular line 2—2 of Fig. 1.
Figure 4:
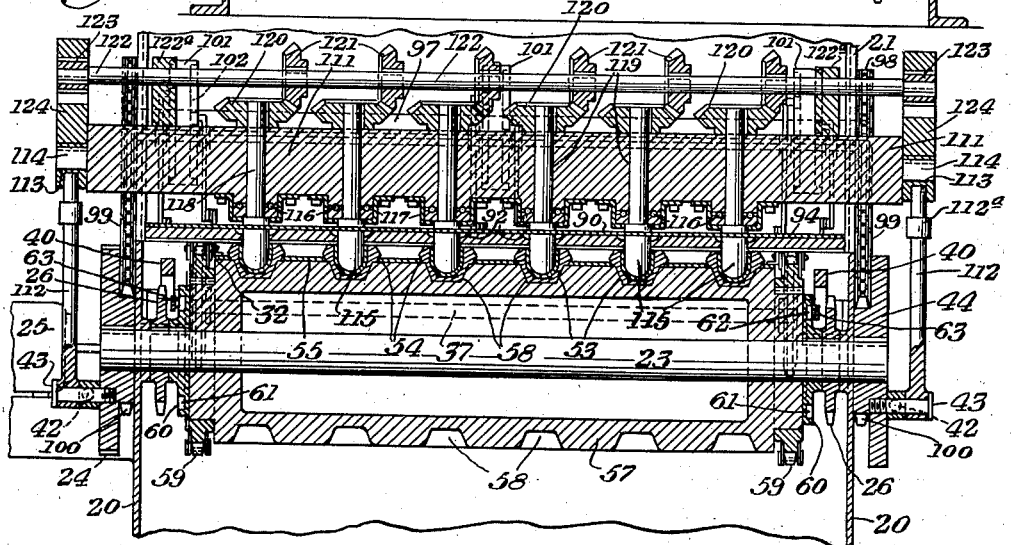
Fig. 4 is a vertical section taken along the line 4—4 of Fig. 1.
Figure 3:
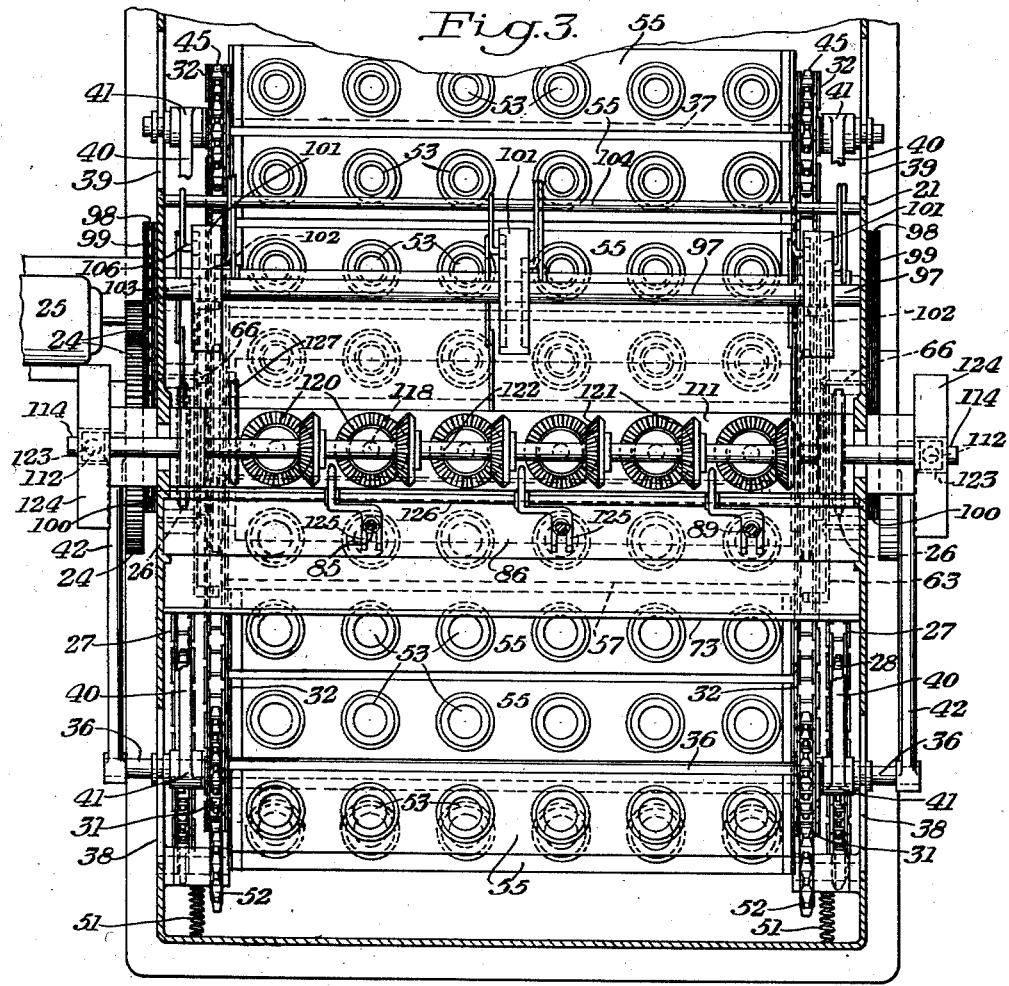
Fig. 3 is a horizontal section of the machine taken along the irregular line 3—3 of Fig. 1.
Figure 11:
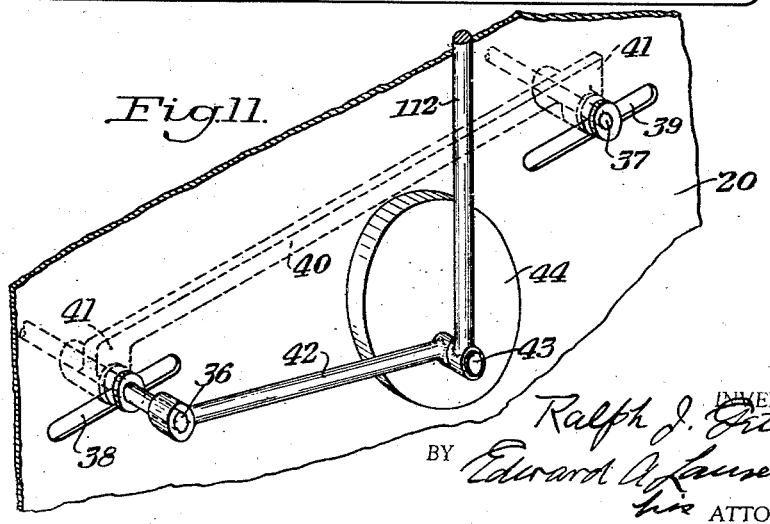
Fig. 11 is a perspective view further illustrating the said means.

Referring first to Fig. 1 of the drawings, the assembled apparatus is contained in a housing comprising a lower portion 20 which is a housing for the mold-presenting mechanism, and an upper portion 21 in which is contained the material-feeding apparatus, the cutting apparatus, and the forming apparatus. 22 represents the housing of the dryer in which the articles are dried after their fabrication and with which the housing 20 is in open communication.

23 represents the main driving shaft, the ends of which are journaled in suitable bearings in the side walls of the housing 20 and protrude therefrom. The shaft 23 is driven through the meshing gears 24 from the motor 25 which may be supported by a suitable bracket mounted on the outer side wall of the housing 20.

Adjacent either end of the shaft 23 and within the housing are the sprockets 26 keyed on said shaft and connected by chains 27 to a pair of sprockets 28 on a shaft 29 whose ends are journaled in the bearings 30 carried by the side walls of the housing 20.

31 represents a pair of smaller sprockets also fixed on shaft 29; inside the sprockets 28. 32 represents the endless carrier chains which are engaged respectively by the sprockets 31 and which work in spaced vertical planes. These conveyor chains extend through the housings 20 and 22 as indicated in Fig. 1. The direction of their travel is indicated by the arrows shown in Fig. 1. The bottom or return flights of the carrier chains are supported from below by the idler sprockets 33 mounted on shafts, the ends of which shafts are journaled in the side walls of the housings 20 and 22.

34 and 35 represent two pairs of sprockets. The sprockets 34 are mounted on a shaft 36 while the sprockets 35 are mounted on a similar shaft 37. The shafts are arranged for free rotation and the ends of said shafts are slidably supported as in the horizontal slots 38 and 39 in the upper ends of the side walls in the housing 20.

Shafts 36 and 37 are arranged to slide in unison by suitable interconnections, such as the bars 40, which have depending ends 41 in which the shafts are journaled.

The sprockets 34 and 35 are arranged for reciprocation in unison in a horizontal plane as by means of links 42, the outer ends of which are provided with eyes which form bearings in which the shaft 36 is journaled adjacent its protruding extremities. The other ends of the links 42 are pivoted on eccentric wrist pins 43 eccentrically mounted on the outer faces of the disks 44 which are keyed on the shaft 23 at the outer sides of the walls of the casing 20.

The wrist pins are eccentric in the sense that their inner portions, to which the links 42 are connected, are off-center relative to their outer portions to which, as will later appear, the pitmen 112 are connected.

The chains 32 also run down around idler sprockets 45 mounted on shaft 46, the ends of which are journaled in the lower side walls of the housing 22. These chains are arranged to travel up and down within the dryer housing 22 so as to maintain the fabricated ware within the dryer for a sufficient length of time without interrupting their continuous travel. For this purpose the chains run around idler sprockets mounted at different elevations in the dryer. One set of said sprockets is indicated at 47 in Fig. 1.

48 represents idler sprockets mounted on a shaft 49 and arranged to press against the chains 32 from within, between the sprockets 35 and 45. The shaft 49 may be journaled in the horizontal slots 50 in the side walls of the housing 20 and resiliently urged toward the chain as by the springs 51.

52 represents similar mounted idler sprockets which are spring urged from without against the flight of chains 32 between the sprockets 31 and 34.

The purpose of the pairs of sprockets 48 and 52 is to prevent slack in the chains and thus they may engage the chains from either direction.

53 represents the molds, a plurality of which are removably stepped in a series of mold sockets 54 aligned longitudinally of each of the trays 55. These sockets may be holes of the proper contour to receive the molds, in which case the molds should be provided with annular shoulders, as shown, to prevent them from dropping through the sockets in the trays.

Again, the sockets may be made by dishing down the material of the trays to form closed pockets to receive the molds, as illustrated at 54a in Fig. 14. In such case the sockets will seat in the pockets of the rotary drum. By this arrangement the exterior surfaces of the molds are protected from undue wear.

The trays 55 are of proper length to be placed between the conveyor chains 32, and the ends of the trays are provided with the upwardly extending brackets 56, the upper ends of which are pivotally mounted on the pivotal members of the conveyor chains. By thus mounting the trays on the chains they are prevented from tilting or upsetting in their travel.

It will of course be understood that the cavitations of the molds are selected to suit the ware to be fabricated, and that the molds are interchangeable so that the machine may be set up to produce the desired character of ware.

57 represents a cylindrical drum rotatably mounted in the shaft 23 and held against longitudinal movement thereon. Spaced about the perimetral surface of said drum are a plurality of longitudinally disposed series of sunken seats 58, said seats being of proper size and dimension to receive therein the portions of the molds 53 which protrude below the trays 55 or the depending portion of the closed pockets of the trays, in accordance with the manner of mounting the molds on the trays which may be selected.

The drum seats 58 of a longitudinal series are spaced apart on the same centers as are the sockets 54 in the trays 55, and the series of seats in the drum are spaced apart perimetrally on the drum on the same centers as are the molds in adjacent trays on the conveyor chains. The mouths of the drum seats 58 are preferably beveled or formed rounded to facilitate the insertion of the molds into and withdrawal therefrom.

Fixed to the drum 57 at either end are the sprockets 59, which engage the horizontal top flight of the conveyor chains 32 whereby, as will hereafter be more fully explained, intermittent rotary motion is imparted to the drum 57 in a clockwise direction as shown in Fig. 1.

Fixed on the shaft 23 at either end of the drum are the disks 60, the outer faces of which are provided with eccentric cam tracks 61, each of which tracks is engaged by a roller 62 rotatably mounted on a pivot pin which connects the adjacent ends of opposed levers 63 and 64. The pivot apertures in the ends of one of these levers is longitudinally slotted to permit free oscillation about the intermediate pivot. These levers are pivoted intermediate of their ends on studs 65 and 66, respectively, which protrude inwardly of the walls of the housing 20. The outer ends of the levers 63 and 64 are provided with angularly disposed stop fingers 67 and 68, which are arranged to move alternately upwardly to engage between the links of the conveyor chains 32 and temporarily halt the travel of the latter during the fabricating step, and to move downwardly and release the chains, in accordance with the travel of the roller 62 in the cam track 61.

It will be understood that the shaft 23 and the drive sprockets 31 are continuously rotated clockwise in Fig. 1. The operation of the stop fingers 67 and 68 alternately halts and permits the resumption of the travel of the top horizontal flights of the conveyor chains. Again the drum 57 is alternately caused to have a rotary movement, and to halt, owing to the engagement of its sprockets 59 with the top flight of the chain; and the parts are so assembled and their movements synchronized that when the drum comes to rest a tray 55 is disposed above the same with the molds carried thereby stepped in the seats 58 of the drum to support the molds while they dwell in the fabricating position.

If the chains were arranged to engage only sprockets rotating on fixed axes, the movement of the top flight of the chains and consequently the travel of the molds would be continuous. Therefore, to provide for the necessary dwell in the fabricating position, I employ the arrangement of the slidably mounted shafts 36 and 37 and the idler sprockets 34 and 35 which are reciprocated by the links 42, to intermittently take up the feed of the chain at the front and to let out the feed of the chain at the rear during the intervals wherein the stop fingers 67 and 68 lock stationary the intermediate portion of the top flight of the chains. To keep the vertical flights of the chain taut and thus insure proper engagement of the chain with the sprockets, I provide the spring actuated idler sprockets 48 and 52. As a further precaution against disengagement of the chains from the sprockets 31 and 45, I provide the spring actuated shoes 69 which resiliently hold the chains in engagement with the sprockets.

I will proceed to describe the means for supplying the material to the machine. Referring to Fig. 1, 70 represents an endless conveyor belt arranged to convey to the machine cylinders or "logs" of clay from the pug or extruding machine. One of said logs is indicated at 71 in full lines. Suitable means are provided to transfer these logs from the belt to the machine. Thus in dotted lines I have indicated the belt as tilted laterally so as to roll the logs one by one down through the opening 72 in the housing 21 and deposit them in the hopper 73, the front wall of which is inclined so that the logs will roll down to the throat 74 thereof. The front wall of the throat, the left in Fig. 1, preferably diverges downwardly as shown.

The throat 74 is divided by a plurality of transverse partitions 75. The number of these partitions is determined by the number of molds on the tray of the conveyor and the partitions are located on vertical planes which intersect the trays half way between the adjacent molds.

Each of these partitions is provided with a curved or cylindraceous shield 76 which fits down over the same and which may be held in position in any convenient manner, such as by being attached at their ends to the side walls of the throat 74. Similar half shields 77 are provided at either end of the throat. The lower portions of the shields are curved inwardly toward the partitions and their lower edges may be inturned to abut against the partitions to provide lateral support for the shields. These inturned edges also serve as top guides for the slidable mold-charge plates and the cutter plates. Means are provided for forcing the clay logs downwardly into the throat of the hopper and for dividing them transversely into short sections to form individual mold-charges.

Thus 78 represents a press-head extending longitudinally of the interior of the hopper and slidably supported at its extremity, as for instance between pairs of vertical guides mounted on the end walls of the hopper as at 79. Secured to said press-head is a plurality of rammers 80 which may be cylindrical and which extend through slidably fitting holes in a tread-board 81. The latter is also slidably supported in the guides 79 and is suspended from the press-head 78 by lost motion means, such as the bolts 82, the lower ends of which are screwed into holes in the tread-plate 81 and which extend up through holes in the press-head 78. The heads of the bolts limit the degree of separation of the tread-board and press-head. Interposed between the board and press-head are the helical springs 83 which resiliently hold the tread-board depressed relative to the press-head.

The lower face of the tread-board 81 between the holes through which the rammers 80 extend, is provided with a facing 84 of flexible material, such as leather, which is arranged to bag or sag as the tread-board is lifted from the clay, thus readily stripping away from the material and preventing the upward drag of the clay.

Rising from the head 78 is a plurality of vertical stems 85 which extend up through holes in a cross head 86. Helical springs 87 are arranged about the stems between the cross head and collars 88 fixed on the stems below the cross head. 89 represents springs connecting the upper ends of the stems 85 with the upper portion of the housing 21, which springs act to raise the entire assembly when pressure is relieved from the cross head 86 to permit more clay to be fed to the hopper, as will be explained later.

The arrangement, as hereinafter will appear, is such that at intervals force is applied to the cross head 86 to force it downwardly, thus by its cushion connection with the stems 85 depressing the press-head 78, the rammers 80 and also, through the springs 83, the tread-board 81. Thus the tread-board presses the log of clay lying in the hopper above the shields 76, down past the shields, which sever the log into relatively short sections, which sections are forced down into the spaces or pockets between the shields. As the tread-board, owing to the resistance of the clay overcoming the expansive force of the springs 83, comes to a halt, the rammers 80 continue their downward travel, forcing the clay sections firmly and compactly into the bottoms of said pockets.

It is to be noted that as the clay passes the greatest diameter or lateral extensions of the shields, the resistance is lessened, as the inwardly and lower portions of the shields provide additional clearance in the lower portions of the pockets. The downwardly diverging front wall of the hopper aids in reducing the resistance to the downward movement of the clay into the bottoms of the pockets.

Slidably mounted on the floor of the hopper and extending through a slot in the rear wall of the latter is a mold-charge plate 90 which is provided with slots 91 for clearance for the partitions 75 as the plate moves into its mold-charge forming position.

The mold-charge plate 90 is provided with a plurality of apertures 92 which are so positioned that when the plate is in its mold-charge forming position one of said apertures is in the center of each of the pockets in the bottom of the hopper. These apertures, which extend through the plate, are preferably enlarged and rectangular at their upper ends but have converging walls and a circular opening 93 at their lower ends. The paths of movement of the mold-charge plates are transverse to the longitudinal line of the hopper.

Slidably mounted on the upper surface of the plate 90 is the cutter 94 which is a shorter plate than the plate 90 but of equal width. The edges of the superimposed plates 90 and 94 extend under the inturned edges of the shields 76 which thus form top guides for the movements of the plates. The plate 94 is provided with an aperture 95 of substantially equal dimensions as that of the upper portion of the aperture 92 in the plate 90. In the aperture 95 are mounted the charge-cutting means, which I illustrate as a plurality of strong wires 96, preferably piano wires, which are tautly strung across the aperture.

During the periods in which the clay is being forced down into the pockets between the shields, each of the plates 90 is positioned with its aperture centered in the corresponding pocket, and the wired apertures 95 of the plates 94 are in registry with the apertures 92.

Thus the clay is forced down into said apertures 92 completely and compactly filling the same, the clay passing down between the wires 96. When the filling operation is completed, the cutter plates 94 are given a limited movement, thus causing the wires to sever the necks of clay which connect the mold charges in the apertures 92 from the mass of material above them. The mold plate is then moved away, toward the right into position above the mold stations and beneath the fabricating plungers, as illustrated in Figs. 1 and 8.

97 represents a jack shaft whose ends are journaled in suitable bearings carried by the side walls of the housing 21 and protrude through the same. The extremities of the shaft 97 have fixed thereon sprockets 98 which are connected by the chains 99 with sprockets 100 of similar diameter fixed on the drive shaft 23. Thus the shaft 97 has the same rotations per minute as has the drive shaft and is rotated in the same direction.

The shaft 97 has fixed thereon the cam disks 101 whose opposite faces are provided with the cam-tracks 102 and 103. 104 is a pivot rod parallel with the shaft 97 and supported by the side walls of the housing 21. Pivotally mounted on the rod 104 are the pairs of angular levers 105 and 106 having at one extremity rollers which engage, respectively, the cam-tracks 102 and 103. The other or lower end of each of the levers 105 is connected by a link 107 with pairs of ears on the front edge of the mold-charge plate 90, and the contour of the cam-track is such that the mold plate is intermittently moved, first into its retracted position wherein its apertures 92 are centered in the pockets in the bottom of the feed hopper, and then after these apertures have been filled and tamped full of clay, the plate moved into the position indicated in Figs. 1 and 8 with its apertures 92 registering with the molds presented in the fabricating position. The floor of the hopper 73 may be extended outwardly to provide an under support for the mold-charge plate in its last described position, said floor of course being cut away to provide clearance for the fabricating plungers as they force the mold-charges into the waiting molds and are then retracted into their uppermost position.

The lower ends of the levers 106 are connected by tandem links 108 and 109 with a cross head 110 to which the cutter plates 94 are fixed. The contour of the cam-track 103 is such that the cutter plates 94 are given a relative quick and reciprocating movement which occurs after the apertures 93 have been tamped full of clay and before the mold-charge plate is shifted into the fabricating position.

111 represents a horizontally disposed cross head which is mounted for vertical reciprocation in the housing 21 and the ends of which extend through vertical slots in the walls of the housing and to which such motion is imparted by means of pitmen 112 whose lower ends are pivotally mounted on the eccentric wrist pin 43 on the disks 44 and whose upper portions are provided with bearings 113 in which are journaled the pivot studs 114 on the ends of the cross head 111.

The wrist pins 43 are made eccentric so that the proper reciprocations are imparted to the links 42 of the pitmen 112. The pitmen 112 are made adjustable as to length by means of screw couplers 112a connecting the end portions of the parted pitmen.

Depending from the cross head 111 are the fabricating plungers 115, one vertically alined with each of the molds in the fabricating system and with the charge apertures 92 when the plate 90 is in its fabricating position. The plungers are of the proper contour to properly fabricate the charges in the mold and to pass freely through the reduced bottom portions 93 of the apertures 92.

The plungers are provided with annular shoulders which support from below the thrust bearings 116 held in place against the lower surface of the cross head 111 as by the annular cup collars 117. The reduced upper portions of the plungers form the stems 118 which extend up through cylindrical bores 119 extending vertically through the cross head 111 which acts as sleeve bearings.

120 represents beveled pinions keyed on the upwardly protruding ends of the stems 118 and also serve to keep the plunger against vertical movement relative to the cross head.

The pinions 120 mesh with other beveled pinions 121 which are fixed on a horizontally disposed shaft 122 whose ends are journaled in and extend through suitable bearings carried by the strands 122a rising from the cross head 111. Outside of said housing the shaft has fixed thereon the pinions 123 which mesh from below with the internal teeth of the quadrants 124 which form upward extensions of the pitmen 112. Thus as the pitman swings in response to the revolution of the wrist pin 43 with the disk 44, the quadrant 124 swings first to one side and then to the other, thus rotating the shaft 122 first in one direction and then in the other direction, and thus turning the plungers alternately in either direction.

Insomuch as the quadrants will be swung more slowly as the wrist pins 43 pass the horizontal centers of their paths, the speed of the rotary movements of the fabricating plungers will decrease toward the center of their stroke and increase toward the ends thereof.

125 represents angular levers which are pivoted on a horizontal rod 126 extending transversely in the housing 21. One end of said levers is disposed in the upper path of movement of the cross head 111, while the other end of the said levers is bifurcated and bears on the cross head 86, preferably straddling the stems 85. Thus as the cross head approaches the upper end of its path of reciprocation the levers 125 are swung counterclockwise in Fig. 6, thus depressing the cross head 86 and forcing the rammers 80 and the tread-bore 81 down on the clay, thus forming mold charges in the apertures 92 of the plates 90 as already described.

As the cross head 111 begins its downward movement, relieving the force exerted by it on the levers 125, the springs 89 elevate the rammers 80, the press-head 78 and the tread-plate 81, to permit another log of clay 71 to be dropped down into the hopper.

The assembly of the parts and the synchronizing of relative operations is such that as the fabricating plungers descend, a row of molds is brought into fabrication position and the corresponding mold boards are shifted so that the apertures containing the mold charges are centered above the molds. As the plungers descend and their lower ends pass through the apertures, the charges are deposited in the molds and formed therein.

The slow rotation of the plungers in one direction as they pass through the apertures 92 and 93 serves to force the mold charges down into the mold, and the increasing speed of rotation serves to evenly spread the clay on over the cavitations and their continued relative rapid rotation as they start their upward movement serves to release the plungers from the fabricated article and to smooth the internal or upper surface of the spread clay. The plungers reverse their direction of rotation mid-way of their strokes.

As the plungers rise, the drum starts a rotary movement and the upper horizontal flight of the carrier chains is resumed, causing the filled molds to move toward the dryer while a new tray of molds moves with the drum toward the fabricating position.

Meanwhile the mold-charge board moves toward the left in Fig. 1 to position its charge apertures into the hopper pockets, whereupon the tread-plate and rammers are forced downward to refill the charge apertures. After the apertures are recharged, the cutter plates are reciprocated, causing the cutter wires to sever the necks which connect the mold-charges with the body of the clay, and the apparatus proceeds with another cycle, as above described.

As a further means for preventing any tendency of the clay to stick to the fabricating plungers as they start upwardly, I may provide means for applying small quantities of a suitable oil or other material to the lower portions of the plungers. Thus I may provide a pipe 127 disposed transversely of the upper part of the housing 21 adjacent to the positions of the fabricating plungers when the latter are in their uppermost positions. The pipe is supplied with oil or other suitable liquid under pressure and bent nozzles 128 are provided to discharge the oil upon the lower portions of the plungers.

It is apparent that my improved machine is relatively simple in construction and operation. The maintenance of the molds stationary in the fabricating position greatly simplifies the mechanical structure required and obviates the shock and strain on moving parts involved in raising and depressing molds and in rotating them on their axes.

It will lbe noted that the mold-charges are deposited in the molds and are fabricated in the latter at one and the same station, thus avoiding the halting of the molds in turn at several stations for the different steps required to segregate the mold-charges from the parent mass of clay, depositing the charges in the molds and then fabricating them into finished ware.

My improved method and means for feeding the clay into the machine and forming mold-charges therefrom provides a satisfactory and practical supply of properly measured mold-charges.

The operation of my improved fabricating plungers is such that the mold charges are first forced down into proper position in the bottom of the molds while the plunger is rotating at lessened speed, so that the mold charges are not whirled, twisted or distorted while they are unsupported from below. The increasing speed of the plungers as they spread the clay in the molds and as they are withdrawn from the spread material, provide an even distribution of the clay over the surface of the cavitations and provide the spread material with a smooth even surface. The rotation of the plungers as they leave the mold, prevents any sticking, tearing or distortion of the spread clay.

Thus the varying speed of rotation of the fabricating plungers is of the greatest importance.

The provision of the rotary mold-supporting drum is also of very substantial advantage. It provides the proper positioning means and support for the molds while the latter are in the fabricating position and prevents their being moved or shifted out of proper registration with the descending plungers.

There is an obvious advantage in providing for the continuous travel of the molds except when the latter are in the fabricating position. Thus, for instance, they may be caused to travel at uniform speed through the dryer.

The means which I employ to provide for the dwell of the molds in the fabricating position is positive in its action and in nowise interferes with the otherwise continuous travel of the carrier chains and mold trays.

It is obvious that my improved machine may be quickly and conveniently set up for the production of a wide range of types of pottery ware by stepping into the sockets or seats of the trays molds having the selected cavitations and installing plungers or plunger heads which are of the proper contour. For the manufacture of many different types of ware molds having the same exterior size and shape may be used, so that the trays and the rotating drum need not be changed, but where, for instance, ware of considerably larger diameter is to be fabricated trays with sockets or seats of the proper dimensions and a drum with seats to receive the same may be easily substituted. In such case a mold-charge plate with charge apertures of the proper dimensions and capacities and fabricating plungers of the proper size and shape would be substituted.

Many other advantages attending the use of my invention will readily suggest themselves to those familiar with the pottery-manufacturing art.

I claim:

1. The method of manufacturing pottery articles in a mold, which comprises separating in one position a portion of the plastic material from the parent mass to produce a mold-charge, transferring the mold charge into registration with a mold, and by the movement of a member axially of the mold both depositing the mold-charge in the mold and shaping it therein forming the pottery article.

2. The method of manufacturing pottery articles in a mold, which comprises separating in one position a portion of the plastic material from the parent mass to produce a mold-charge, transferring the mold charge into registration with a mold, depositing the mold-charge in the mold and shaping the mold-charge therein by the movement of a forming member axially of the mold, and imparting a rotary movement to the member during the shaping operation.

3. The method of manufacturing pottery articles in a mold, which comprises separating a portion of the plastic material from the parent mass to produce a mold-charge, transferring the mold-charge into registration with a mold, and by the progressive movement of a forming member axially of the mold depositing the mold-charge and shaping the same in the mold.

4. The method of manufacturing pottery articles in a mold, which comprises separating a portion of the plastic material from the parent mass to form a mold-charge, transferring the mold-charge into registration with the mold, depositing the mold-charge and shaping the same in the mold by the movement of a forming member axially of the mold, and imparting a rotary movement to the member during the shaping operation.

5. In apparatus for manufacturing pottery articles, the combination of a carrier having continuous motion except in the forming position, a series of molds mounted on the carrier and arranged by the movement of the latter to be brought in turn into the forming position, means for holding the molds stationary in the forming position during the forming operation, and means for successively depositing mold-charges in and shaping mold-charges in the molds while in the forming position.

6. In apparatus for manufacturing pottery articles, the combination of a carrier having continuous motion except in the forming position, a series of molds mounted on the carrier and arranged by the movement of the latter to be brought in turn into the forming position, means for holding the molds stationary in the forming position during the forming operation, and means moving axially of the molds for successively depositing mold-charges in and shaping mold-charges in the molds while in the forming position.

7. In apparatus for manufacturing pottery articles, the combination of an endless chain carrier, molds mounted on said carrier, power means for imparting continuous movement to the carrier, and means comprising sprockets in spaced relation and engaging said carrier and arranged for movement in unison and parallel to the flight of the carrier to cause the molds in turn to dwell in a forming position.

8. In apparatus for manufacturing pottery articles, the combination of an endless chain carrier, molds mounted on said carrier, power means for imparting continuous movement to the carrier, and means comprising sprockets in spaced relation and engaging said carrier at either side of a forming position and arranged for movement in unison and parallel with the flight of the carrier to cause the molds in turn to dwell in the forming position.

9. In apparatus for manufacturing pottery articles, the combination of means for presenting molds in a forming position, and means comprising sockets arranged to receive and support the molds during the forming operations.

10. In apparatus for manufacturing pottery articles, the combination of means for presenting molds in a forming position, and means mounted to rotate on a horizontal axis for undersupporting the molds during the forming operations, said last mentioned means being arranged for intermittent movement to engage and disengage them from the molds as the latter approach and leave the forming position.

11. In apparatus for manufacturing pottery articles, the combination of means for presenting molds in a forming position, and means comprising sockets arranged to receive and support the molds during the forming operations, said last mentioned means being arranged for intermittent movement to engage and disengage them from the molds as the latter approach and leave the forming position.

12. In apparatus for manufacturing pottery articles, the combination with a mold, of a forming member arranged for reciprocation axially of the mold and to have rotary movement for shaping mold-charges therein, the speed of rotation of said member increasing as it moves toward the mold and decreasing as it leaves the mold.

13. In apparatus for manufacturing pottery articles, the combination with a mold, of a forming member arranged for reciprocation axially of said mold for shaping mold-charges therein, means for producing mold-charges and for transferring the mold-charges into position between the forming member and the mold and in registration with the mold whereby the movement of the forming member deposits the mold-charges in the mold preparatory to shaping the same therein.

14. In apparatus for manufacturing pottery articles, the combination of a mold, a container arranged to receive the plastic material, a member movable into and out of said container and provided with an aperture to receive material to form a mold-charge, means to sever the material in the aperture from the parent mass, and means to move the member to deliver the mold-charge to the mold.

15. In apparatus for manufacturing pottery articles, the combination of a mold, a forming member arranged for movement axially of the mold to deposit and shape mold-charges therein, a container arranged to receive the plastic material, a member arranged for movement into and out of the container and into and out of registration with the mold, said member having an aperture therein to receive plastic material to produce a mold-charge, and means for severing said mold-charges from the parent mass.

RALPH J. GETTY.

DISCLAIMER 2,139,362.—*Ralph J. Getty*, Pittsburgh, Pa. METHOD AND APPARATUS FOR MANUFACTURING POTTERY ARTICLES. Patent dated December 6, 1938. Disclaimer filed March 17, 1943, by the inventor; the assignee, *William J. Miller*, consenting.

Hereby enters this disclaimer to claims 1, 3, 13, and 15, in said patent.

[*Official Gazette April 13, 1943.*]

DISCLAIMER

2,139,362.—*Ralph J. Getty*, Pittsburgh, Pa. METHOD AND APPARATUS FOR MANUFACTURING POTTERY ARTICLES. Patent dated December 6, 1938. Disclaimer filed June 17, 1944, by the assignee, *William J. Miller*.

Hereby enters this disclaimer to claims 5, 6, and 9 in said specification.

[*Official Gazette July 18, 1944.*]